United States Patent
Doi

(10) Patent No.: US 10,671,550 B1
(45) Date of Patent: Jun. 2, 2020

(54) MEMORY OFFLOADING A PROBLEM USING ACCELERATORS

(71) Applicant: INTERNATIONAL BUSINESS MACHINES CORPORATION, Armonk, NY (US)

(72) Inventor: Jun Doi, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/238,949

(22) Filed: Jan. 3, 2019

(51) Int. Cl.
*G06F 13/16* (2006.01)
*G06F 3/06* (2006.01)

(52) U.S. Cl.
CPC ........ *G06F 13/1668* (2013.01); *G06F 3/0604* (2013.01); *G06F 3/0631* (2013.01); *G06F 3/0656* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 8,997,073 B2* | 3/2015 | Ravi | ....................... | G06F 8/452 |
| | | | | 717/151 |
| 9,032,017 B1 | 5/2015 | Singh et al. | | |
| 2010/0192123 A1* | 7/2010 | Carey | ....................... | G06F 8/30 |
| | | | | 717/106 |
| 2010/0198997 A1* | 8/2010 | Archer | .................... | G06F 13/30 |
| | | | | 710/22 |
| 2012/0131309 A1* | 5/2012 | Johnson | .................... | G06F 9/30 |
| | | | | 712/41 |
| 2015/0302283 A1 | 10/2015 | Sugimoto et al. | | |
| 2016/0070701 A1 | 3/2016 | Lim et al. | | |
| 2018/0095750 A1* | 4/2018 | Drysdale | ............... | G06F 9/5044 |
| 2018/0356989 A1* | 12/2018 | Meister | ............... | G06F 11/2089 |

* cited by examiner

*Primary Examiner* — Michael Sun
(74) *Attorney, Agent, or Firm* — Tutunjian & Bitetto, P.C.; Vazken Alexanian

(57) ABSTRACT

A computer-implemented method for offloading a problem having $2^n$ size from processing circuitry to one or more accelerators is disclosed. The processing circuitry and the one or more accelerators include respective memories. In the method, a problem having $2^n$ size is divided into a plurality of units each having $2^u$ size. At least a part of the units is allocated to the one or more accelerators. A determination is made as to whether there is a remaining part of the units to be allocated onto the processing circuitry. A temporary buffer is prepared on each memory of at least the one or more accelerators. The temporary buffer is used for storing a copy of a dependent unit stored on a different memory, during inter-unit calculation.

20 Claims, 14 Drawing Sheets

MEMORY OFFLOADING A PROBLEM USING ACCELERATORS

BACKGROUND

Technical Field

The present disclosure, generally, relates to memory offloading technology for computing, more particularly, to techniques for offloading a problem with a size of a power of 2 from processing circuitry to one or more accelerators.

Description of the Related Art

In typical computing environment, a system memory usually has a size of a power of 2 (e.g., $2^m$ GB, m is an integer). Also, there are many applications that have a size of a power of 2 (e.g., $2^n$ size, n is an integer corresponding to the number of dimensions in the problem), including quantum computing simulation, FFT (Fast Fourier Transform), multi-dimensional lattice problem (e.g., 512×512× 512), etc.

Since a part of a $2^m$ GB system memory is also occupied by OS (Operating System) kernels, drivers and applications, only half of the system memory can be used for storing the problem of $2^n$ size, even if the size of the part occupied by the system is much lower than the half of the system memory. Thus, the maximum problem size in a given resource may be limited and it is difficult to utilize all the space in the system memory.

Heterogeneous computing with accelerators (e.g., GPU, FPGA, etc.) is now common for high performance computing (HPC). Since the accelerators generally have less memory space than the system memory, the problem size that can be stored on the accelerator is limited to much smaller than that of the system memory. The memory of the accelerator is often used for only temporary storage (i.e., cache). Hence, all the data is stored on the system memory and a part of the data is copied to the accelerators for calculation.

Therefore, there is a need for developing novel technology capable of efficiently allocating a problem having a size of a power of 2 on a computer system.

SUMMARY

According to an embodiment of the present invention, a computer-implemented method for offloading a problem having $2^n$ (n is an integer) size from processing circuitry to one or more accelerators is provided. The processing circuitry and the one or more accelerators include respective memories. The method includes dividing a problem having $2^n$ size into a plurality of units each having $2^u$ (u is an integer) size. The method also includes allocating at least a part of the units to the one or more accelerators. The method further includes determining whether there is a remaining part of the units to be allocated onto the memory of the processing circuitry. The method includes further preparing a temporary buffer on each memory of at least the one or more accelerators, in which the temporary buffer is used for storing a copy of a dependent unit stored on a different memory, during inter-unit calculation.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIGS. 8A, 8B, 8C, and 8D illustrate schematics of pairwise calculations with various pair distances during the simulation of a particular single-qubit quantum gate operation according to an exemplary embodiment of the present invention;

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for offloading a problem having $2^n$ size from processing circuitry to one or more accelerators.

Hereinafter, referring to a series of FIGS. 1-9, a computer system and a method for offloading a problem having $2^n$ (n is an integer) size on a computer system, in which the computer system includes a general-purpose processor and one or more accelerators and the problem having $2^n$ size is a simulation of a quantum system having n qubits, will be described. Then, referring to a series of FIGS. 10-12, a computer system and a method for offloading a problem having $2^n$ (n is an integer) size on a computer system, in which the computer system includes a plurality of computing nodes each including a general-purpose processor and one or more accelerators and the problem having $2^n$ size is a sub-problem of the simulation of the quantum system having m qubits (m is an integer larger than n), will be described. Then, referring to FIG. 13, experimental studies on the novel memory offloading functionality according to the exemplary embodiment of the present invention will be described. Finally, referring to FIG. 14, a hardware configuration of a computer system according to one or more embodiments of the present invention will be described.

Exemplary Embodiment

Now, referring to a series of FIGS. 1-9, a quantum computing simulation system and methods for offloading a simulation of a quantum system having n qubits from a general-purpose processor to one or more accelerators are described.

Figure 1:
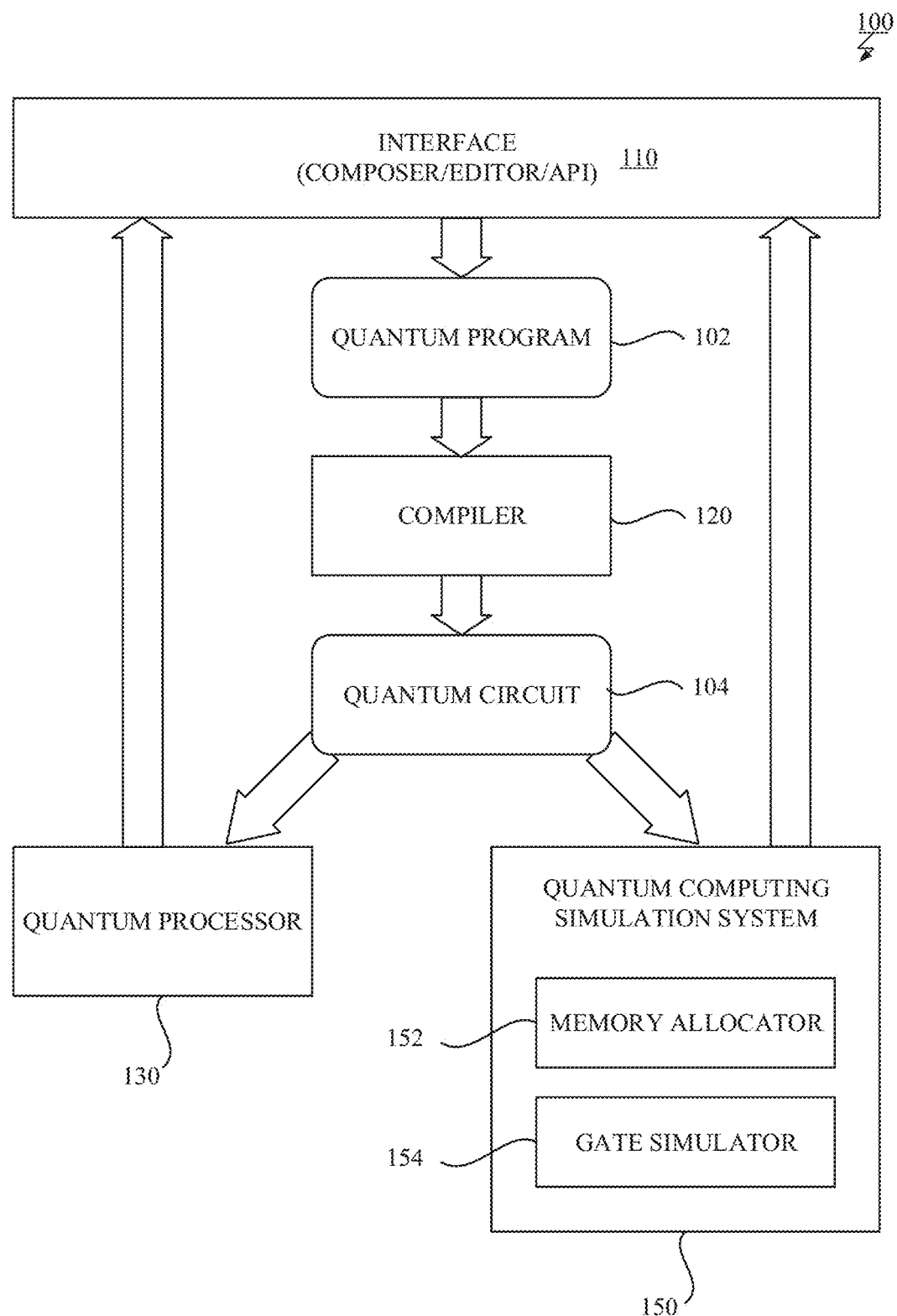
FIG. 1 illustrates a block diagram of quantum computing environment that includes a quantum computing simulation system according to an exemplary embodiment of the present invention.

FIG. 1 illustrates a block diagram of quantum computing environment 100 (Hereinafter, simply referred to as the environment 100) that includes a quantum computing simulation system 150 implementing a novel memory offloading functionality according to an exemplary embodiment of the present invention. In the environment 100, there are several components, including a user interface 110; a compiler 120; and a quantum processor 130 in addition to the quantum computing simulation system 150.

The user interface 110 allows users to run quantum algorithms and experiments and explore simulations in the environment 100. The user interface 110 may include a composer, an editor and APIs (Application Programming Interfaces), through which users can access the quantum computing platform. The composer is a graphical user interface to allow users to create their own quantum circuits visually. The editor is a graphical user interface to allow users to edit their own quantum program, which is an intermediate representation for quantum instructions, using a particular quantum program language. The API is designed to enable users to programmatically interact with the quantum computing hardware and simulators. The API enables users to execute a code programmed by using the particular programming language.

The quantum program 102 given from a user through the user interface 110 may be interpreted and compiled by the compiler 120 into a quantum circuit 104 in order to run efficiently on a particular configuration. The compiled version of the quantum circuit 104 is translated into a sequence of operations performed by hardware equipment to control the qubits. The output is then passed back to the user through the user interface 110. The users may get the results through the user interface 110 by either running the quantum circuit 104 on the real quantum processor 130 or by using the quantum computing simulation system 150.

The quantum processor 130 may be a real quantum processor, which is made up of a plurality of physical quantum bits (also referred to as "qubits"). A qubit is the physical carrier of quantum information and can be realized by two physical states described by quantum mechanics, which may include polarization of photons, electron spins, nuclear spins, internal states of atoms, ions or molecules, states of quantized electric circuit such as a superconducting circuit, etc. In a particular embodiment, the quantum processor 130 may be made up of a plurality of superconducting transmon qubits, which are Josephson junction based qubit and are made on silicon wafers with superconducting metals such as niobium and aluminum. In the particular embodiment, quantum gates may be performed by sending electromagnetic impulses to the qubits through coaxial cables.

The quantum computing simulation system 150 computes the quantum state expected to be produced by the given quantum circuit in a n qubit system. The quantum computing simulation system 150 includes a memory allocator 152 that allocates memory space for simulating the n qubit system over available resources; and a gate simulator 154 that simulates a quantum gate operation applied to a single or multiple qubit(s) in the n qubit system, which constitutes the given quantum circuit.

Note that a quantum circuit is a set of instructions to a quantum computer and it is a series of quantum gates targeted on different qubits along time. The quantum circuit may begin by preparing the qubits in well-defined states (e.g., the ground state), then executing a series of one- and two-qubit gates in time, followed by a measurement of the qubits.

As described above, the qubit is the physical carrier of quantum information. The quantum state of the qubit can take values of $|0\rangle$, $|1\rangle$, or the linear combination of both, which is known as superposition. The computational basis corresponds to the two levels $|0\rangle$ and $|1\rangle$, which correspond to the following vectors:

$$|0\rangle = \begin{pmatrix} 1 \\ 0 \end{pmatrix}, \; |1\rangle = \begin{pmatrix} 0 \\ 1 \end{pmatrix}.$$

A superposition is a weighted sum or difference of two or more states. The qubit can be in an arbitrary quantum state, denoted $|\psi\rangle$, which can be any superposition of the basis vectors, $|\psi\rangle = \alpha|0\rangle + \beta|1\rangle$. The superposition quantities $\alpha$ and $\beta$ are complex numbers; both obey $|\alpha|^2 + |\beta|^2 = 1$. If a qubit in some state $|\psi\rangle$ is measured in the computational basis, the result 0 is obtained with probability $|\alpha|^2$, and the result 1 is obtained with the complementary probability $|\beta|^2$.

A quantum gate is an operation applied to a qubit to change its state. A single-qubit quantum gate can be represented by a 2×2 unitary matrix U. Since the quantum gates are needed to be reversible and preserve probability amplitudes, the matrices are unitary. The quantum state $|\psi'\rangle$ after the action of the quantum gate is found by multiplying the original quantum state by the gate, $|\psi'\rangle = U|\psi\rangle$.

There are various types of the gate operations, which may include single-qubit gates: an identity gate (I); Pauli gates such as bit-flips (X), phase-flips (Z), a combined bit-flip and phase-flip (Y); Clifford gates such as Hadamard gate (H) and phase gates (S, $S^\dagger$) for generating quantum superpositions and complex quantum phases; non-Clifford gates such as phase gates (T, $T^\dagger$); and multiple-qubit gates such as two-qubit controlled NOT gate (CNOT) for generating entanglement, three-qubit controlled controlled NOT gate (CCNOT). There are more general forms of the single qubit gate operations, including U1, U2, U3, which take in one, two and three parameters, respectively.

A quantum measurement takes any superposition state of the qubit, and projects the state to either the state |0> or the state |1>, with a probability determined from the superposition quantities.

The quantum computing simulation system 150 computes the quantum states of the n qubit system expected to be produced by performing a series quantum gates targeted on respective qubits that are defined in the given quantum circuit. The quantum computing simulation system 150 may be located on a cloud computing environment or a local computing environment of users.

Figure 2:
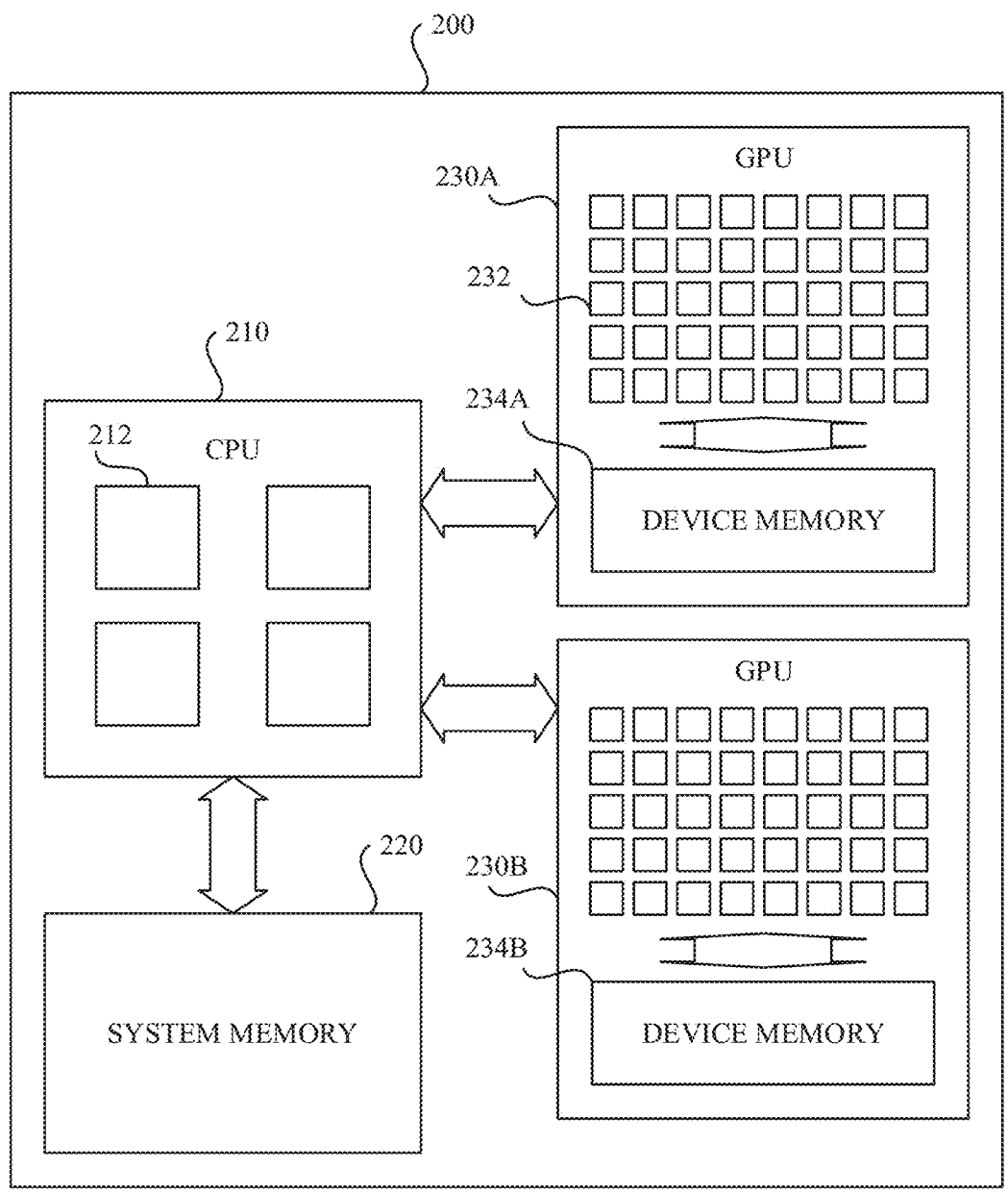
FIG. 2 depicts a schematic of configuration of computing environment used for simulating quantum computing according to a particular embodiment of the present invention.

With reference to FIG. 2, a schematic of configuration of computing system used for simulating the quantum computing according to a particular embodiment of the present invention is described. The quantum computing simulation system 150 shown in FIG. 1 is built on a classical ("classical" in a sense countering "quantum" computers) computer system. In FIG. 2, there is one computing node 200 that includes a CPU (Central Processing Unit) 210 as the general-purpose processor, a system memory 220, and one or more GPUs (Graphical Processing Units) 230 as the accelerators.

The CPU 210 is operably coupled to the system memory 220 through a memory bus interface. The system memory 220 may be a random access memory (RAM) and accommodate OS (Operating System) kernels, drivers and applications, as well as program instructions and data for performing the simulation of the quantum computing. The CPU 210 may have a plurality of cores 212.

The CPU 210 is also operably coupled to the GPUs 230 through a peripheral bus interface such as PCIe™ (Peripheral Component Interconnect Express), NVLink™. The GPU 230 has a plurality of cores 232, and a device memory 234 accessible by the cores 232. The device memory 234 may also be RAM and accommodate firmware as well as program instructions and data for performing calculation of the simulation of the quantum computing.

In the described embodiment shown in FIG. 2, there are two GPUs 230, 230B as hardware accelerators. However, the number of the accelerators is not limited to two. In other embodiment, there may be one accelerator or three or more accelerators in the computing node 200. Also note that in the described embodiment, GPUs are used as the accelerators. However, any hardware accelerator, which may include other specialized processors that are implemented on FPGAs (Field Programmable Gate Arrays) or ASICs (Application Specific Integrated Circuits), can be used. Also note that the number of the computing nodes is not limited to one. In other embodiment, there may be two or more computing nodes prepared for the quantum computing simulation system 150. Extension for a multiple node configuration will be described in more detail later.

Figure 3:
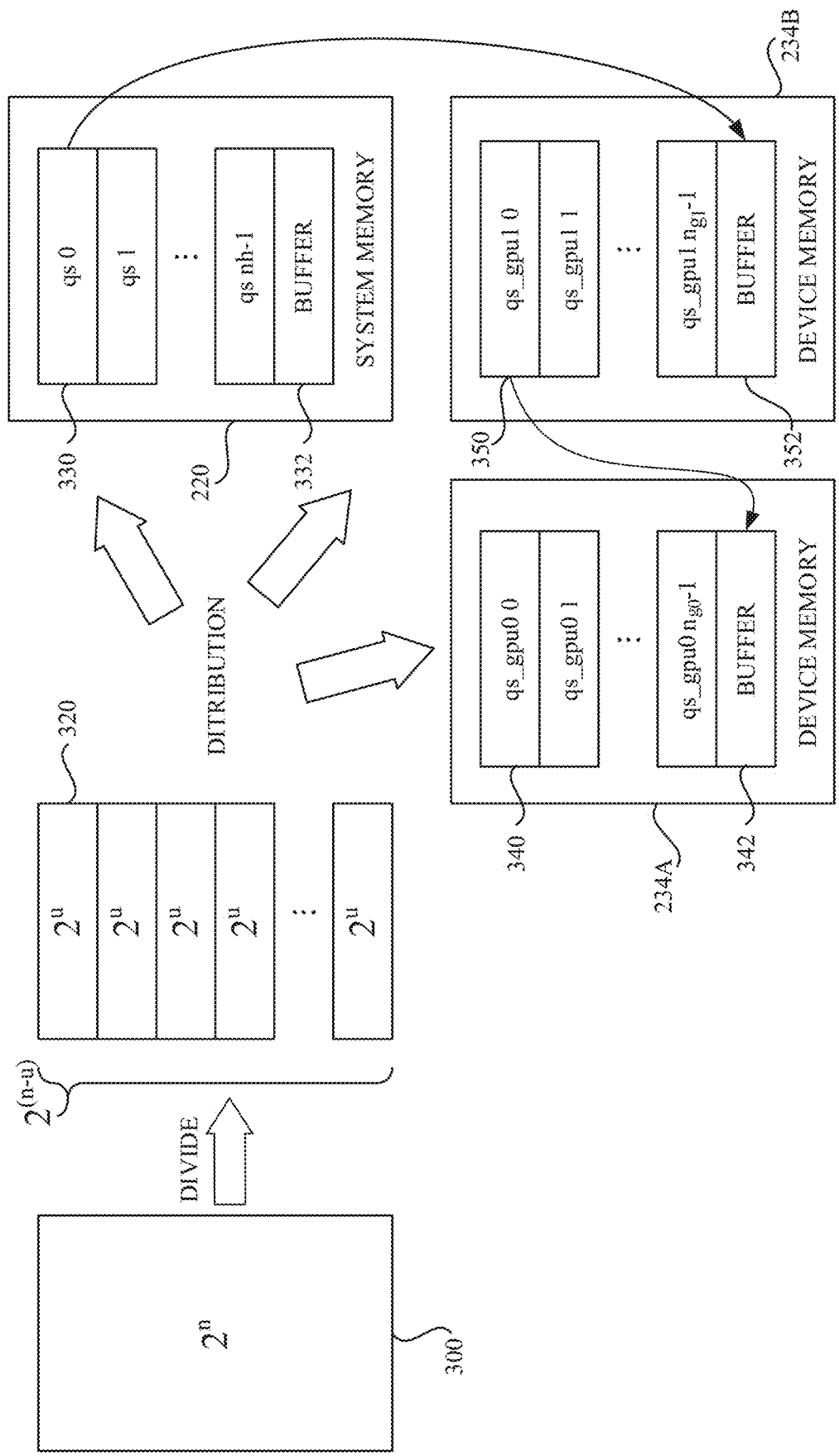
FIG. 3 illustrates a way of allocating n qubit system over system and device memories according to an exemplary embodiment of the present invention.

Referring to FIG. 3, a way of allocating n qubit system over the system and device memories 220, 234 is described. As described above, the quantum system is generally made up of multiple qubits. The complex vector space of an n qubit system has a dimension equal to $2^n$. The computational basis is a set of all binary patterns for $k \in \{0, 2^n-1\}$. For example, the computational basis for two qubits is $\{|00>|01>, |10>, |11>\}$; the basis for three qubits is $\{|000>, |001>, |010>, |011>, |100>, |101>, |110>, |111>\}$; and so on, which shows exponential increase of the number of the binary strings. In the simulation of the quantum computing, the state of the n qubit system can be represented by $2^n$ quantum amplitudes, which are complex numbers. Thus, the simulation of the n qubit quantum system is a problem with a size of n-th power of 2.

For example, when double precision complex number is used as the quantum amplitude, available memory size of $16*2^n$ bytes (e.g., 512 GB for 35 qubits system) is needed. Since a part of the system memory 220 is also occupied by the OS kernels, the drivers and the applications, only half of the system memory 220 can be used for storing the problem having $2^n$ size. Thus, the simulation of the n qubit system generally needs double size of the problem itself (e.g., 1024 GB system memory may be needed for 35 qubits system). Thus, the maximum problem size in given resource is limited and it is difficult to utilize all the space of the system memory 220.

In order to handle $2^n$ problem efficiently, the memory allocator 152 in the quantum computing simulation system 150 provides novel memory offloading functionality that leverages the memory space of the device memory 234 of the GPU 230 as a storage for storing the $2^n$ problem itself partially, instead of using as a temporary cache storing a copy of a master stored on a system memory. The gate simulator 154 simulates a quantum gate operation applied to a single or multiple qubit(s) in the n qubit system that is managed by using the memory allocator 152.

In the novel memory offloading functionality, the problem 300 having $2^n$ size (n is an integer representing the number of qubits in the quantum system) is first divided into a plurality of smaller units 320, each of which has $2^m$ size (u is an integer given as a parameter). The number of the units 320 obtained from the problem 300 is $2^{(n-u)}$. The units 320 obtained are distributed over the system memory 220 and the device memories 234 (there are two device memories 234A, 234B in FIG. 3). In distributing the units 320, a part or whole of the units 320 ($\Sigma n_{gi}$; $n_{gi}$ denotes the number of the units allocated to a GPU assigned with an identifier i (i=0, . . . , # of the accelerators−1)) may be allocated onto the device memories 234 of the GPUs 230 within the total available memory capacity afforded by the GPUs 230.

When the number of the qubits n is relatively small, the whole of the units 320 can be allocated onto the device memories 234 of the GPUs 230. On the other hand, when the number of the qubits n is relatively large, only a part of the units 320 ($\Sigma n_{gi} < 2^{(n-u)}$) can be allocated onto the device memories 234 and a remaining part of the units 320 ($2^{(n-u)} - \Sigma n_{gi}$) is allocated onto the system memory 220.

The reason for allocating the units 320 on the device memory 234 of the GPU 230 at first is because the performance of calculations by the GPU 230 is generally higher than that of the CPU 210 so that it is more efficient.

During a simulation of a gate operation applied to single qubit or multiple qubits in the n qubit system, unit-wise calculations between paired quantum amplitudes are performed by the gate simulator 154. Depending on the type of the gate operation to be simulated and/or the parameter of the gate operation such as target and/or control qubits, the calculation may be either unit-independent calculation or inter-unit calculation. The unit-independent calculation can be performed by both the CPU 210 and GPUs 230 within a single unit independently. In contrast, the inter-unit calculation needs a reference to other counterpart unit, which may be stored on the same place where one counterpart unit is stored, or a place different from the place where one counterpart unit is stored. These mutually dependent units are referred to as dependent units.

At least one temporary buffer 342/352 is prepared on each of the device memories 234. In the described embodiment, at least one temporary buffer 332 may be prepared further on the system memory 220. The temporary buffers 332, 342, 352 may have the same size as the unit $2^u$ (actually $2^u \times 2^e$ bytes, e is an integer representing a size per element). The temporary buffers 332, 342, 352 can be used for storing a copy of the dependent unit stored on a different place, during the inter-unit calculation. As illustratively shown by curved arrows in FIG. 3, the temporary buffer 342 on the device memory 234A can be used for storing a copy of a dependent unit 350 stored on other device memory 234B. The temporary buffer 345 on the device memory 234B can be used for storing a copy of a dependent unit 330 stored on the system memory 220.

During the inter-unit calculation, if a unit stored on the system memory 220 has a dependency with a unit stored on the device memory 234A/234B, the unit stored on the system memory 220 is copied to the temporary buffer 342/352 on the device memory 234A/234B. By performing calculations, the content of the copy of one counterpart unit stored on the temporary buffer 342/352 of the device memory 234A/234B and the content of other counterpart unit originally stored on the device memory 234A/234B would be updated. In response to the copy stored on the temporary buffer 342/352 being updated, an updated version of the copy is copied back to the system memory 220 where the original of the copy is placed, by way of the data movement. On the other hand, when all the dependent units are stored on the same place, the inter-unit calculation can be done without data copy.

Inter-accelerator dependency is also handled in the same manner. If a unit stored on the device memory 234A of one GPU 230A has a dependency with a unit stored on the device memory 234B of other GPU 230B, the unit stored on the device memory 234A is copied to the temporary buffer 352 on the device memory 234B of the other GPU 230B. In response to the copy stored on the temporary buffer 352 being updated, an updated version of the copy is copied back to the device memory 234A where the original of the copy is placed.

Since the GPU generally shows higher performance than the CPU, the data copy may be more preferably done in a direction from the system memory 220 to the device memory 234 as compared to the opposite direction, when both CPU and GPU needs reference to other.

Note that the number of the temporary buffers 332, 334, 352 on each memory 220, 234A, 234B, is not limited to one. At least one temporary buffer is sufficient since the calculation can be processed sequentially. However, in other embodiments, there may be a plurality of temporary buffers on each memory. By preparing the plurality of the temporary buffers on each memory, pipeline processing can be possible to allow overlapping execution of multiple calculations involving different units copied to the temporary buffers. Also, the temporary buffer 332 on the system memory 220 may be omitted in some case.

Note that the integer u is a parameter that may be depending on computer configurations, including the bandwidth of the memory bus interface, the bandwidth of the bus interface between the CPU and GPUs, etc. When u is too large, the memory space of the system memory can not be sufficiently saved as the space for the buffer gets larger. On the other hand, when u is too small, efficiency of data copy would degrade. So, the parameter u can be tuned by performing a benchmark (such as using randomized circuits, QFT (Quantum Fourier Transformation) circuits) so as to maximize the performance.

The parameter $n_{gi}$ may also be depending on computer configurations such as available size of the device memory 234. For example, when each GPU 230 has a 16 GB device memory, 15.5 GB memory space can be used for storing the units (its size is $n_{gi}$*unit size bytes) and the temporary buffer 342. By setting the size of the unit u to an appropriate small size, it is possible to reduce the needed size of the temporary buffer, which also consumes the device memory.

With reference to a series of FIGS. 4-9, the novel memory offloading functionality will be further described in more detail.

Figure 4:
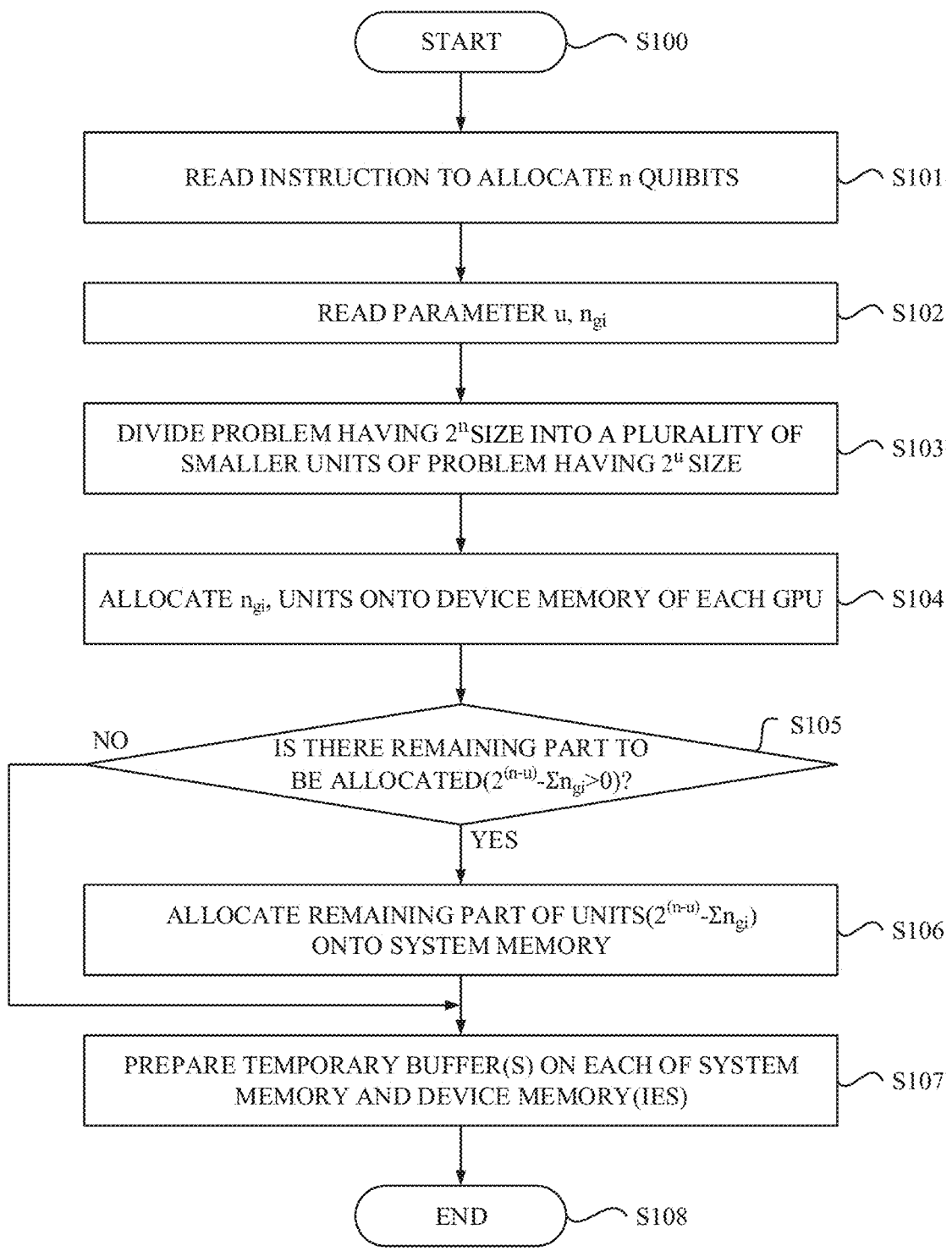
FIG. 4 is a flowchart depicting a process for allocating memory space for n qubit system over the system and device memories according to an exemplary embodiment of the present invention.

FIG. 4 is a flowchart depicting a process for allocating memory space for n qubit system over system and device memories according to an exemplary embodiment of the present invention. The process shown in FIG. 4 may be performed by the CPU 210 and begin at step S101.

At step S101, the CPU 210 may read an instruction to allocate n qubits on the system. This instruction may correspond to a quantum register declaration with designation of qubits n, which may be included in a given quantum program. At step S102, the CPU 210 may read parameters of memory allocation, which may include u, $n_{gi}$. At S103, the CPU 210 may divide the problem having $2^n$ size that is the simulation of the n qubit quantum system into $2^{(n-u)}$ smaller units of problem, each of which has $2^u$ size.

At step S104, the CPU 210 may allocate $n_{gi}$ units onto the device memory 234 of each GPU 230 (i=0, . . . , # of the accelerators−1). Totally, at least a part ($\Sigma n_{gi}$) of the $2^{(n-u)}$ smaller units is allocated onto the device memory(ies) 234 within the total memory capacity afforded by the GPU(s) 230.

At step S105, the CPU 210 may determine whether there is a remaining part to be allocated onto the system memory 220 or not ($2^{(n-u)} - \Sigma n_{gi} > 0$). When the CPU 210 determines that there is at least a remaining unallocated unit in step S105, the process may branch to step S106. At step S106, the CPU 210 may allocate the remaining part of the units ($2^{(n-u)} - \Sigma n_{gi}$) onto the system memory 220 and then the process may proceed to step S107. On the other hand, when the CPU 210 determines that there is no unallocated unit anymore in step S105, the process may proceed directly to step S107.

At step S107, the CPU 210 may prepare a temporary buffer on each of the system memory 220 and the device memory(ies) 234, which can be used for storing a copy of a dependent unit stored on a different memory, during inter-unit calculation. Then, the process may end at step S108.

Figure 5:
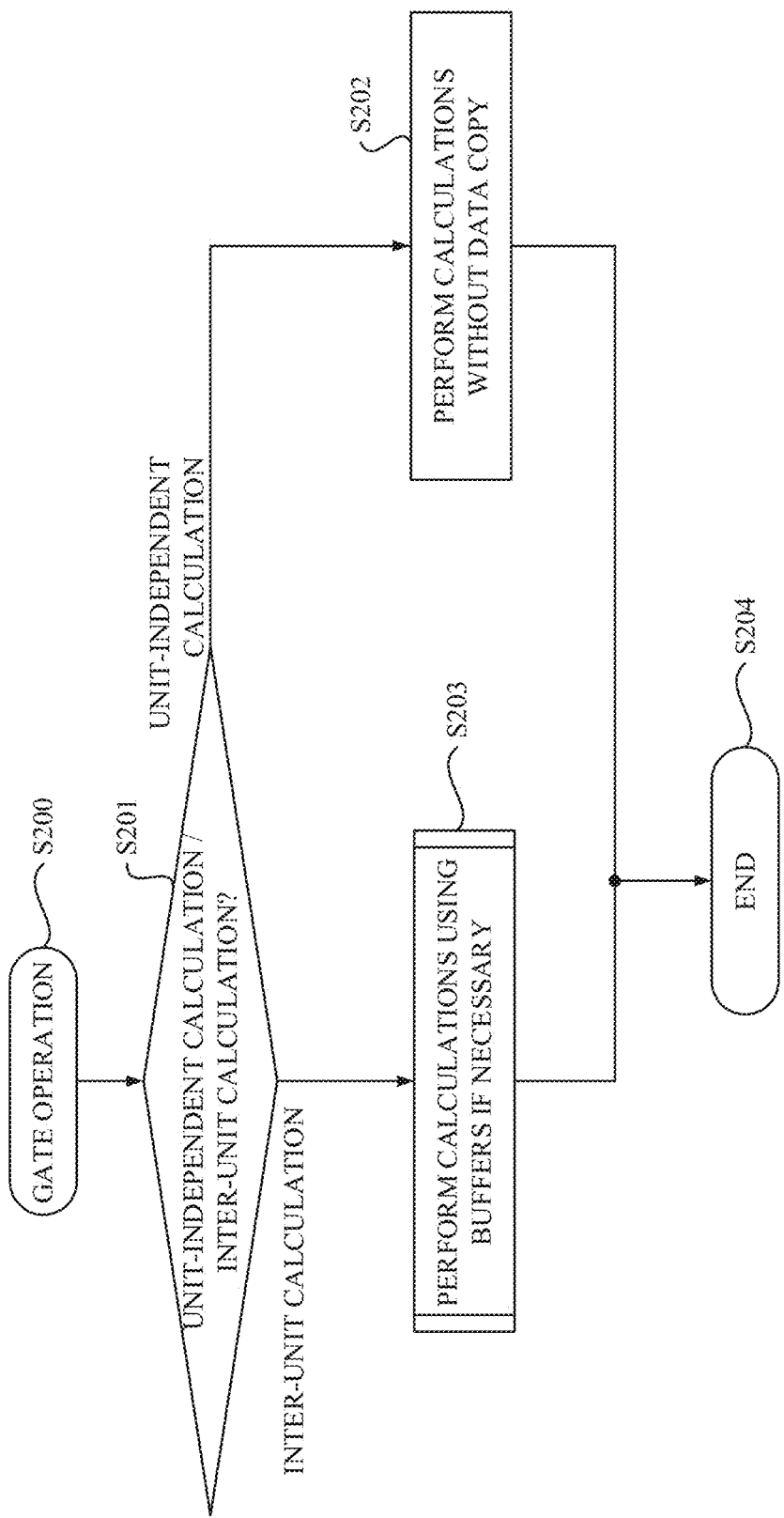
FIG. 5 is a flowchart depicting a process for performing a simulation of a quantum gate operation on the n qubit system according to an exemplary embodiment of the present invention.

FIG. 5 is a flowchart depicting a process for performing a simulation of a quantum gate operation on the n qubit system. The process shown in FIG. 5 may be performed by the CPU 210. The process shown in FIG. 5 may begin at step S200 in response to an instruction to perform a particular gate operation, which may be issued after the memory allocation process shown in FIG. 4.

At step S201, the CPU 210 may determine which of the unit-independent calculation and the inter-unit calculation is needed. The necessity of the inter-unit calculation can be determined based on a distance between quantum amplitudes involved in pairwise calculations for simulating the particular quantum logic gate. Note that the distance may correspond to an address offset between paired two elements (quantum amplitudes).

Figure 7:
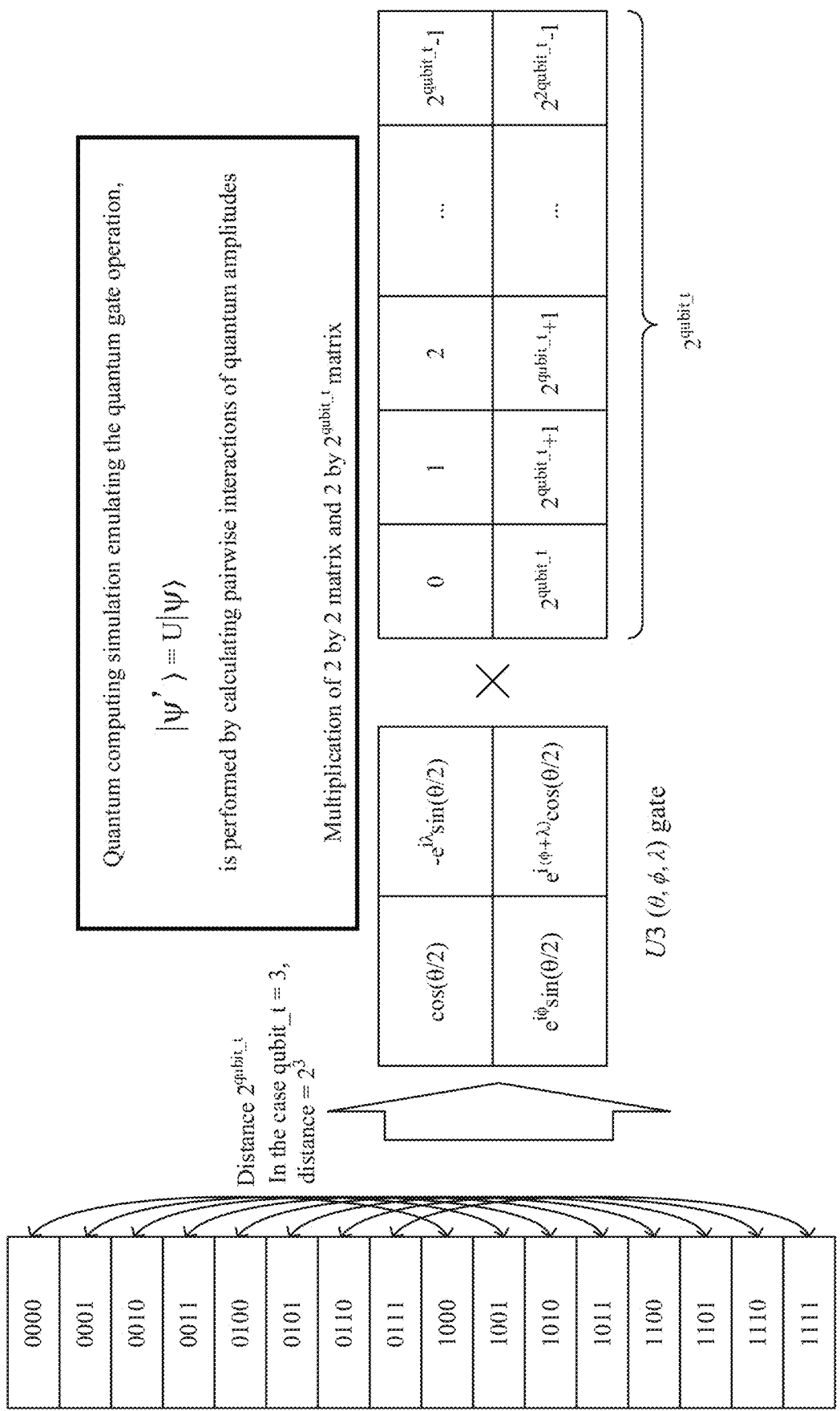
FIG. 7 depicts a schematic of calculations for simulating a particular single-qubit quantum gate operation according to an exemplary embodiment of the present invention.

FIG. 7 depicts a schematic of calculations for simulating a particular single-qubit quantum gate operation. The example of the single-qubit quantum gate operation shown in FIG. 7 is one of physical single qubit gate operations with three parameters U3 (θ, ϕ, λ), which can be represented by following equation:

$$U3(\theta, \phi, \lambda) = \begin{pmatrix} \cos(\theta/2) & -e^{i\lambda}\sin(\theta/2) \\ e^{i\phi}\sin(\theta/2) & e^{i(\phi+\lambda)}\cos(\theta/2) \end{pmatrix}.$$

The U3 (θ, ϕ, λ) gate operation is applied to a target qubit (qubit_t) designated also in the instruction of the quantum gate operation. As illustrated in FIG. 7, the quantum computing simulation that emulates the quantum gate operation U3 (θ, ϕ, λ) can be performed by calculating pairwise interactions of quantum amplitudes that are designated by the target qubit (qubit_t). The quantum amplitudes involved in this pairwise interaction has a distance of $2^{qubit\_t}$. The simulation of the quantum gate operation U3 (θ, ϕ, λ) applied to the target qubit, qubit_t can be implemented as a multiplication of a 2×2 unitary matrix U3 and a $2 \times 2^{qubit\_t}$ matrix holding the quantum amplitudes as elements as shown in FIG. 7. Since the pairwise interactions of the quantum amplitudes are defined by the distance $2^{qubit\_t}$, the target qubit (qubit_t) dominates whether calculation can be completed within one unit (i.e. unit-independent calculation) or references to different units are needed (i.e. inter-unit calculation).

FIGS. 8A, 8B, 8C, and 8D illustrate schematics of pairwise calculations with various pair distances during the simulation of the particular single-qubit quantum gate operation U3. FIGS. 8A, 8B, 8C, and 8D show cases where a problem corresponds to a 4-qubit system, for the sake of convenience of description. The problem with 16 quantum amplitudes $C_k$ (k∈{k=0000, ..., 1111}) is divided into four units. Each unit is a sub-problem holding four quantum amplitudes $C_k$ (k∈{xx00, ..., xx11}, where xx is a prefix of the binary strings (xx∈{00, 01, 10, 11}). In FIGS. 8A, 8B, 8C, and 8D, each unit is denoted by a thick rectangle. The paired amplitudes needed for one pairwise calculation are connected by a curve with bidirected arrows.

Figures 8A, 8B, 8C, 8D:
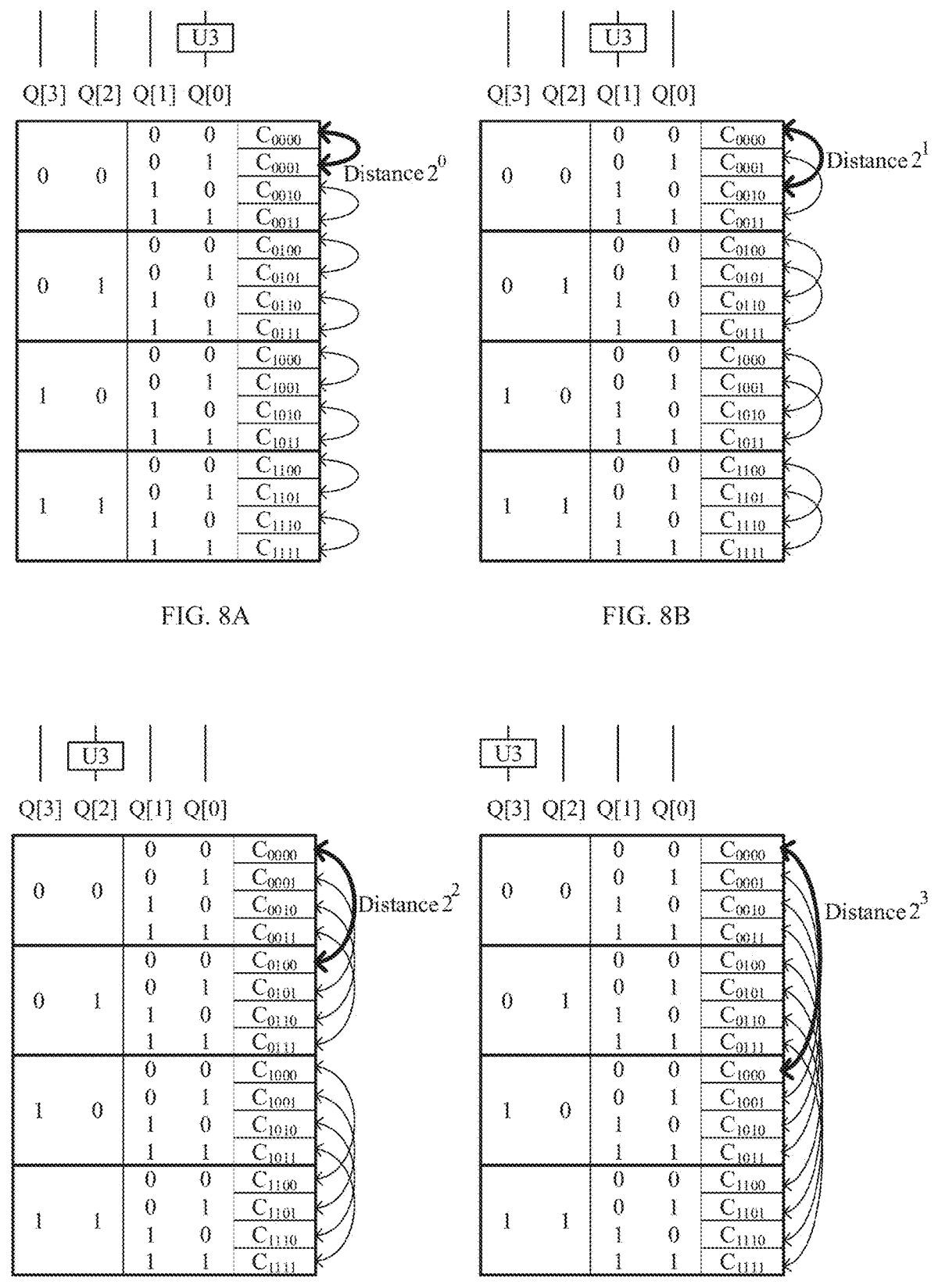

FIG. 8A shows a case where the target qubit is equal to 0, thus the distance of the pair is $2^0$. FIG. 8B shows a case where the target qubit is equal to 1, thus the distance of the pair is $2^1$. These cases correspond to cases where the unit-independent calculation can be performed since all quantum amplitudes involved in a pairwise calculation are located within a single unit.

FIG. 8C and FIG. 8D show cases where the target qubit is equal to 2 and 3, accordingly, the distance of the pair is $2^2$ and $2^3$, respectively. These cases correspond to cases where the inter-unit calculation is needed since quantum amplitudes involved in a pairwise calculation are located across different two units. The paired quantum amplitudes are located on adjacent units in the case shown in FIG. 8C, whereas the paired amplitudes are located on two adjacent units in the case shown in FIG. 8D.

Thus, determination as to whether the inter-unit calculation is needed can be done by checking a condition regarding the target qubit (qubit_t) and the size of the units (u). If the target qubit is equal to or more than the size of the units (qubit_t>=u), the inter-unit calculation is determined to be needed.

Note that the gate operation shown in FIG. 7 and FIGS. 8A, 8B, 8C, and 8D is the physical gate U3 (θ, ϕ, λ), which is one of a single qubit gate operations. As similar to the aforementioned exemplary gate operation, there may be other quantum gates where determination as to whether the inter-unit calculation is needed can be based on the distance of the pair.

FIGS. 9A, 9B, 9C, and 9D illustrate schematics of pairwise calculations with various pair distances during the simulation of other particular two-qubit quantum gate operation CNOT. FIGS. 9A, 9B, 9C, and 9D show cases where a problem corresponds to a 4-qubit system, as similar to the cases shown in FIGS. 8A, 8B, 8C, and 8D. The CNOT gate operation can be represented by the following equation:

$$CNOT = |0\rangle\langle 0| \otimes I + |1\rangle\langle 1| \otimes X, = \begin{pmatrix} 1 & 0 & 0 & 0 \\ 0 & 1 & 0 & 0 \\ 0 & 0 & 0 & 1 \\ 0 & 0 & 1 & 0 \end{pmatrix}.$$

Figure 9A:
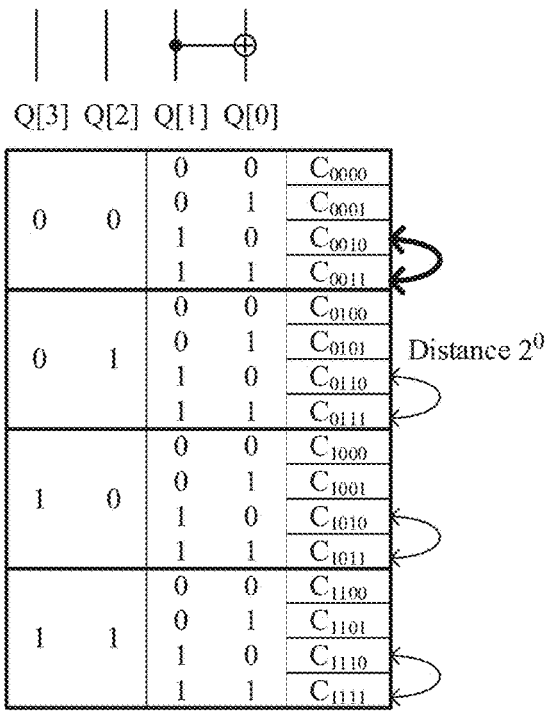
FIGS. 9A, 9B, 9C, and 9D illustrate schematics of pairwise calculations with various pair distances during the simulation of other particular gate operations according to an exemplary embodiment of the present invention.
Figure 9B:
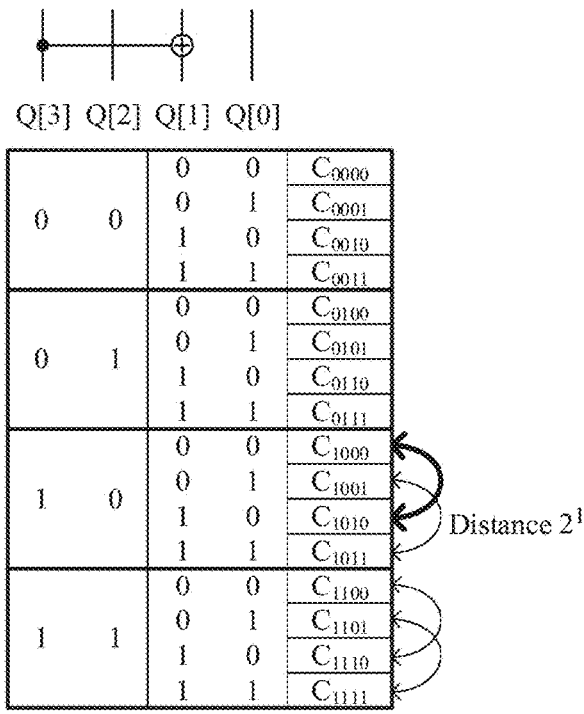
Figure 9C:
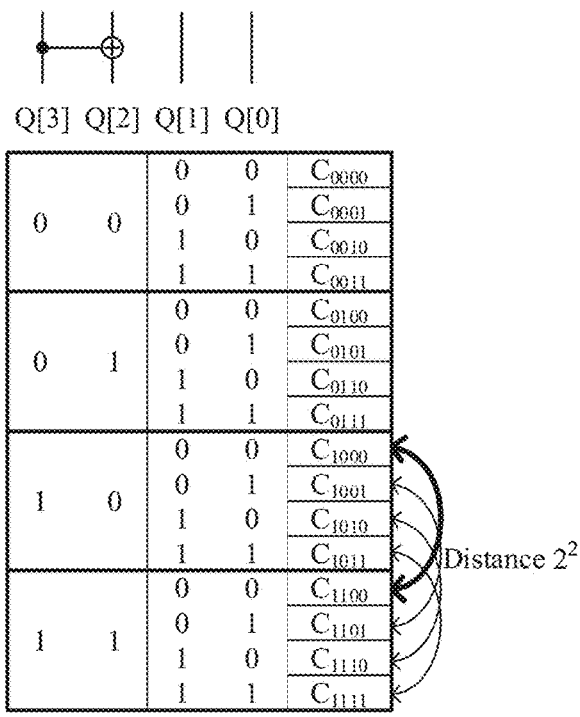
Figure 9D:
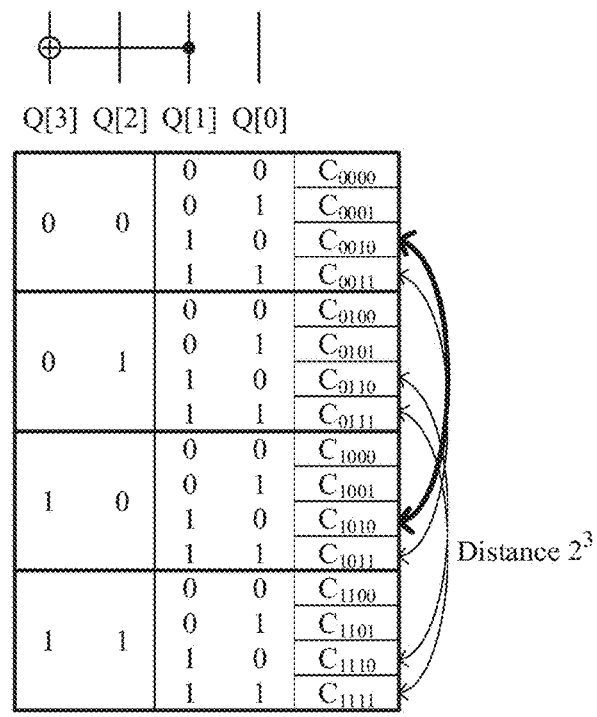

FIGS. 9A and 9B show cases where the target qubit is equal to 0 and 1, accordingly, the distance of the pair are $2^0$ and $2^1$, respectively. These cases correspond to cases where the unit-independent calculation can be performed. On the other hand, FIG. 9C and FIG. 9D show cases where the target qubit is equal to 2 and 3, accordingly, the distance of the pair is $2^2$ and $2^3$, respectively. These cases correspond to cases where the inter-unit calculation is needed.

Note that the CNOT gate operation has another parameter, that is a control qubit (qubit_c), which is also designated in the instruction of the CNOT gate. In FIGS. 9A, 9B, 9C, and 9D, the qubit at the solid-dot end of the CNOT gate is the control qubit that controls whether or not the target qubit at the circled-plus end of the CNOT gate is inverted. In FIGS. 9A, 9B, 9C, and 9D, the amplitudes needed for one pairwise calculation are also connected by a curve with bidirected arrows. In contrast to the case of the gate operation U3, the pairwise calculation is performed between amplitudes whose binary strings k have a bit "1" at the position corresponding to the control qubit, more specifically, when a result of bitwise AND operation between the binary string k and $2^{qubit\_c}$ shows non-zero value (k & $2^{qubit\_t}$!=0).

Other gate operation where the necessity of the inter-unit calculation is determined based on the distance may include Pauli bit-flips (X), a combined bit-flip and phase-flip (Y); Hadamard gate (H), physical gate with two parameters U2, two-qubit controlled unitary gate (Λ(U)), three-qubit controlled controlled NOT gate (CCNOT), etc. However, among the various types of the gate operations, there may be certain gate operations where the unit-independent calculation can be always performed regardless of the distance between the pair of the quantum amplitudes. Such gate operation may include the identity (I), the Pauli phase-flip gate (Z), Clifford phase gates (S, S†), non-Clifford phase gates (T, T†), a physical gate with one parameter U1. Thus, the necessity of the inter-unit calculation is determined based on the distance of the pair and/or the type of the quantum logic gate.

Referring back to FIG. 5, when the unit-independent calculation is determined to be needed in step S201, the process may branch to step S202. At step S202, the CPU 210 may perform unit-independent calculation on the processing circuitry (if the remaining units are allocated) and the one or more accelerators independently without data copy and then the process may end at step S204.

On the other hand, when the inter-unit calculation is determined to be needed in step S201, the process may branch to step S203. At step S203, the CPU 210 may perform the inter-unit calculation on the processing circuitry (if the remaining units are allocated) and the one or more accelerators using the temporary buffer if necessary, and then the process may end at step S204.

Figure 6:
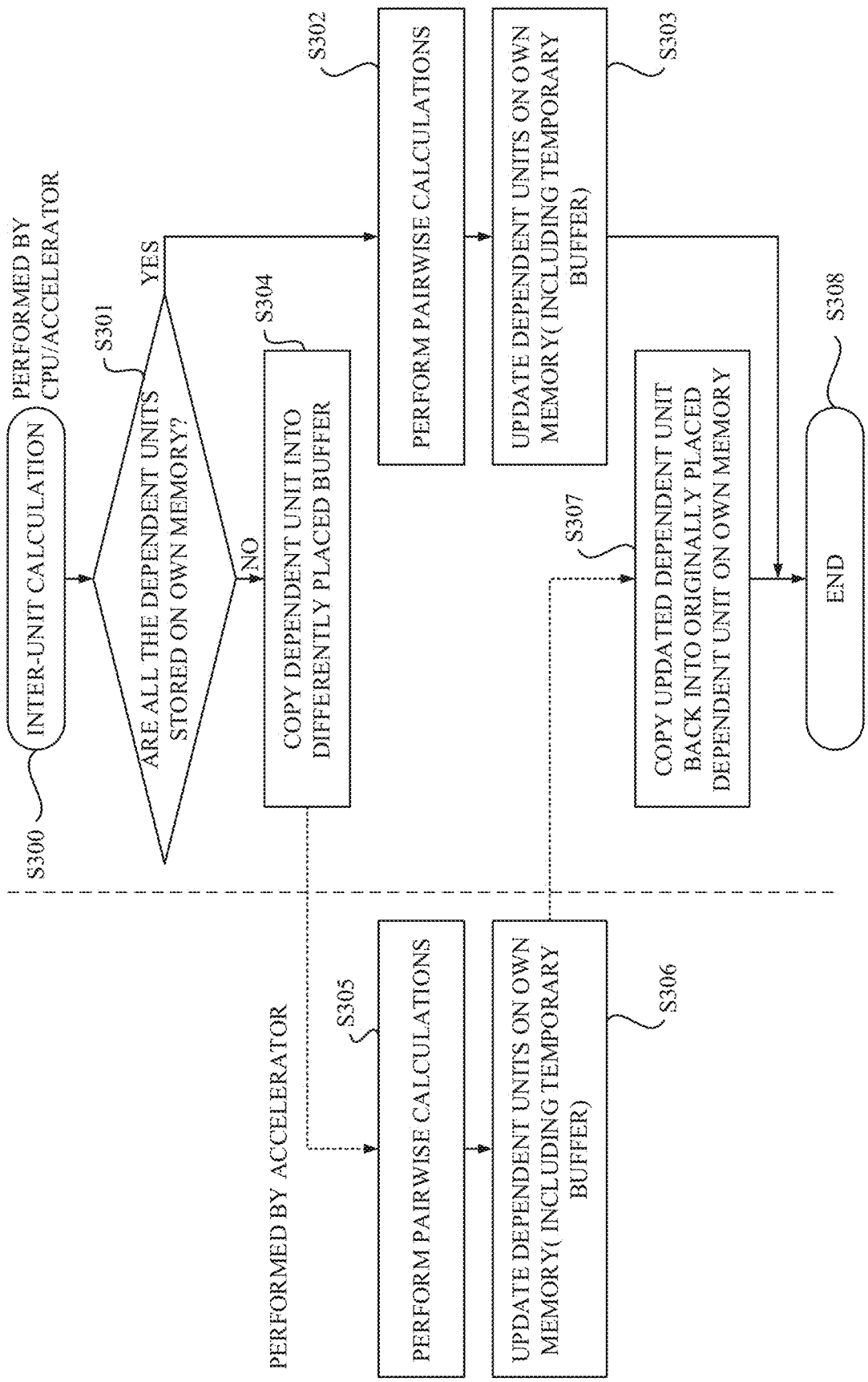
FIG. 6 is a flowchart depicting a process for performing inter-unit calculation in simulation of a quantum gate operation according to an exemplary embodiment of the present invention.

FIG. 6 is a flowchart depicting a process for performing inter-unit calculation in simulation of quantum gate operation. The process shown in FIG. 6 may be performed by the CPU 210 or the GPU 230 for each unit allocated thereto when the inter-unit calculation is determined to be needed at step S201 in FIG. 5. The process may begin at step S300 in response to step S203 in FIG. 5.

At step S301, the CPU 210 or the GPU 230 may determine whether all the dependent units are stored on its own memory or not. The determination as to whether all the dependent units are stored on its own memory can be done based on the allocation information of the units. When the unit stored on its own memory have the dependency with other unit stored also on own memory (thus do not have the dependency with a unit stored on other memory), and accordingly, all the dependent units are determined to be stored on own memory in step S301 (YES), the process may branch to step S302. At step S302, the CPU 210 or the GPU 230 may perform pairwise calculations without using the temporary buffer for data copy. At step S303, the CPU 210 or the GPU 230 may update dependent units on own memory and the process may end at step S308.

If the unit stored on its own memory has a dependency with a dependent unit stored on other memory, it is determined that not all the dependent units are stored on own memory in step S301 (NO). In this case, the process may branch to step S304.

At step S304, the CPU 210 or the GPU 230 may copy the dependent unit stored on its own memory into differently placed buffer that is temporary buffer on other GPU. On the GPU side to which the dependent unit is copied, at step S305, the GPU may perform pairwise calculations. At step S306, the GPU may update dependent units on its own memory (including the temporary buffer). Note that the steps S305 and S306 in the process for one dependent unit correspond to the steps S302 and S303 in the process for the counterpart dependent unit performed by the GPU to which the one dependent unit is copied. On the GPU side, in response to the dependent unit being copied into its own temporary buffer from the CPU 210 or the other GPU 230, the GPU determines that all the dependent units are stored on own memory (including temporary buffer) at step S301, performs pairwise calculations and at step S302, and updates dependent units on own memory (including temporary buffer) at step S303.

On the side of the CPU 210 or the GPU 230 where the unit is originally placed, in response to the copy stored on the temporary buffer being updated, the CPU 210 or the GPU 230 may copy an updated version of the copy back into the originally placed dependent unit on own memory from the temporary buffer 234 by way of data movement, and the process may end at step S308. The consistency between the copy and the original of the unit are preserved by an appropriate mechanism.

According to the embodiments described herein above, novel technology capable of efficiently allocating a problem having a size of a power of 2 on a computer system is provided.

By virtue of the novel memory offloading functionality, $\Sigma n_{gi}*$(unit size) memory space can be saved, so now the size of the problem is equal to the size of the system memory ($2^n$*size of element bytes=$2^m$), and hence maximum problem size can be doubled.

In the aforementioned embodiments, the computer system includes only one computing node and n represents both of the number of the qubits in the quantum system and the size of problem to be divided. However, embodiments may not be limited to the specific embodiments where there is only one computing node. In other embodiments, a computer system including a plurality of computing nodes can also be prepared for the quantum computing simulation system 150 in order to simulate larger qubit system.

Figure 10:
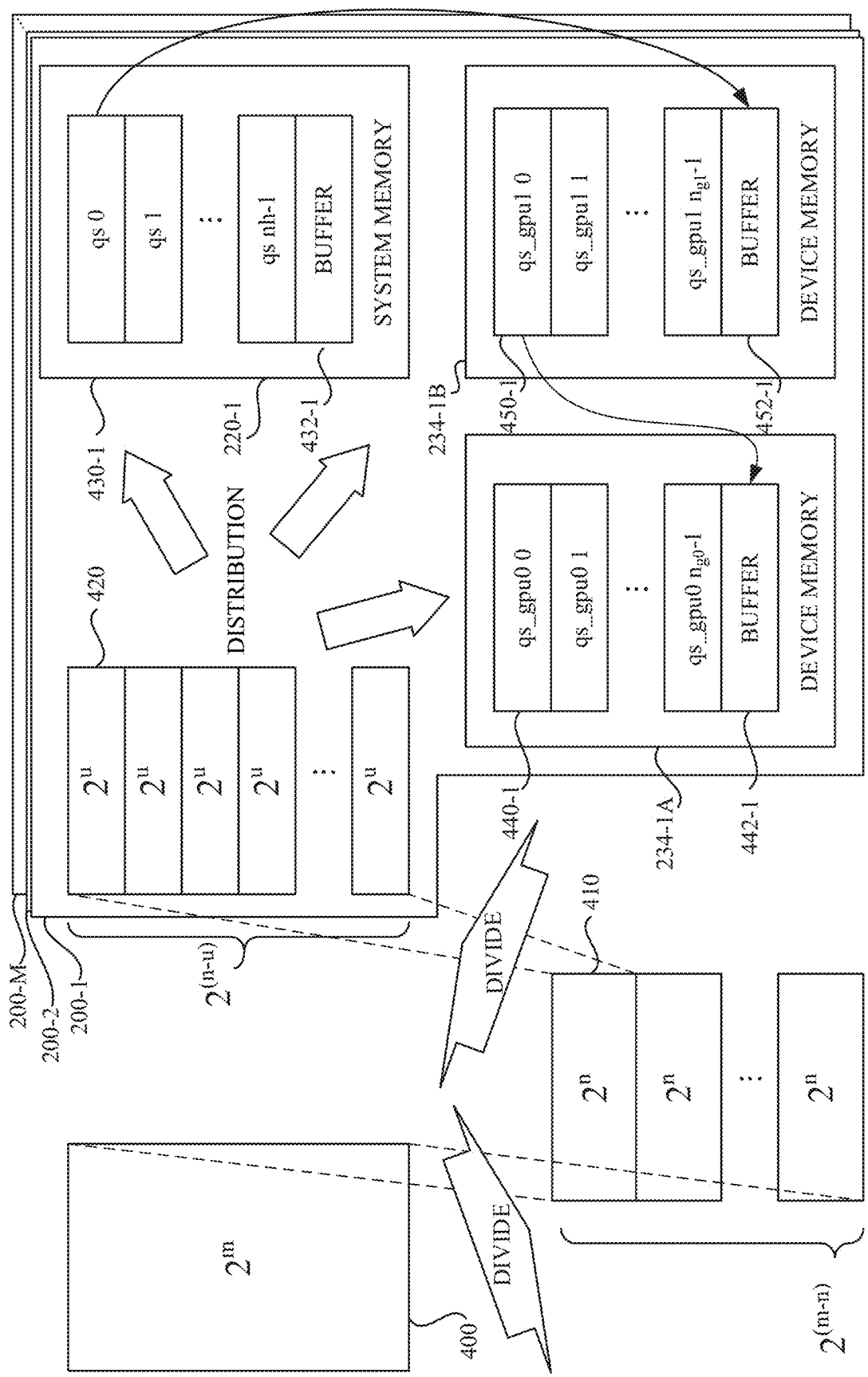
FIG. 10 illustrates a way of allocating m qubit system having $2^m$ size over a plurality of computing nodes, each of which includes system and device memories, according to another exemplary embodiment of the present invention.
Figures 11A, 11B, 11C:
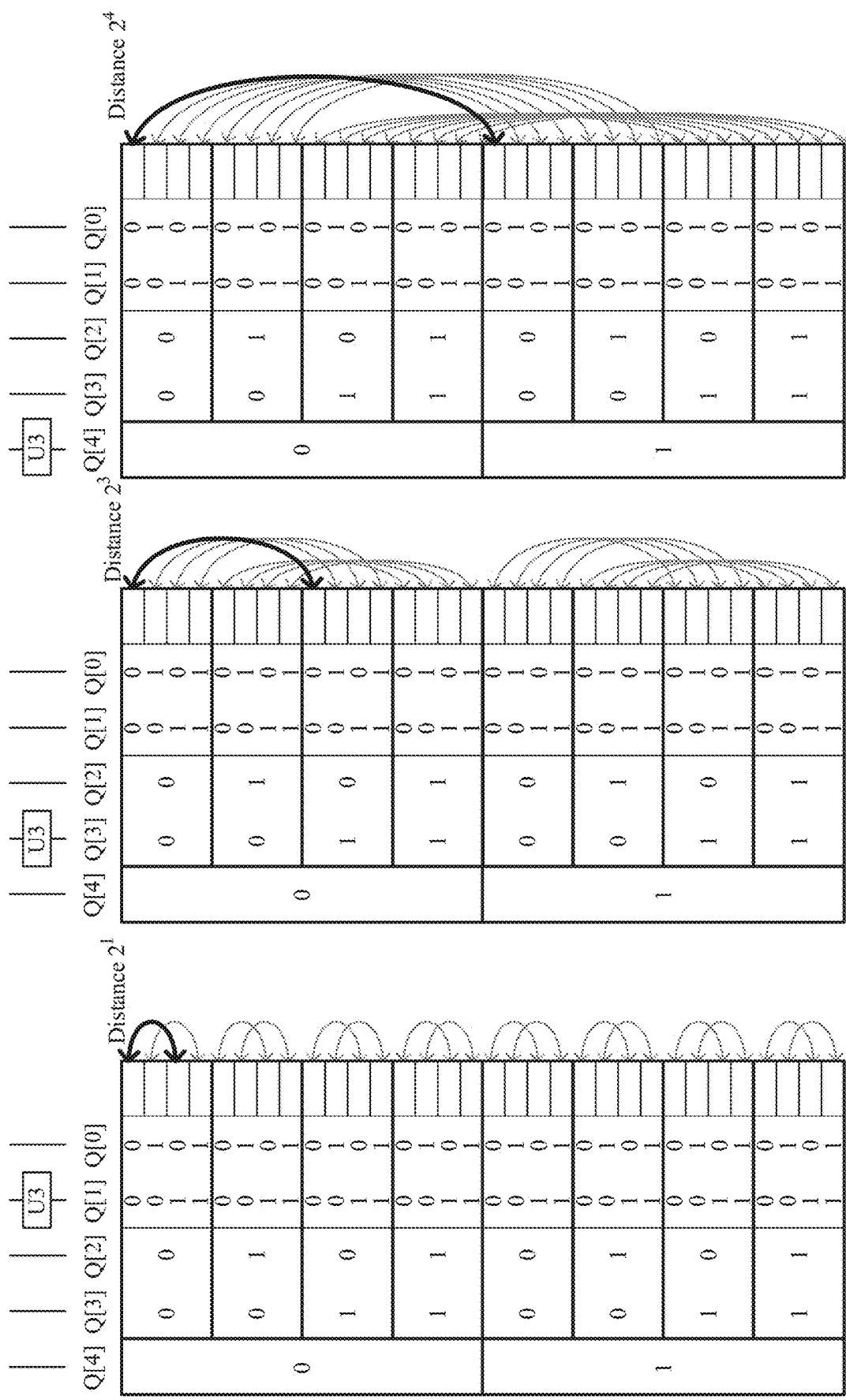
FIGS. 11A, 11B, and 11C illustrate schematics of pairwise calculations with several pair distances during simulation of a particular single-qubit quantum gate operation in multi-node system according to another exemplary embodiment of the present invention.
Figure 12:
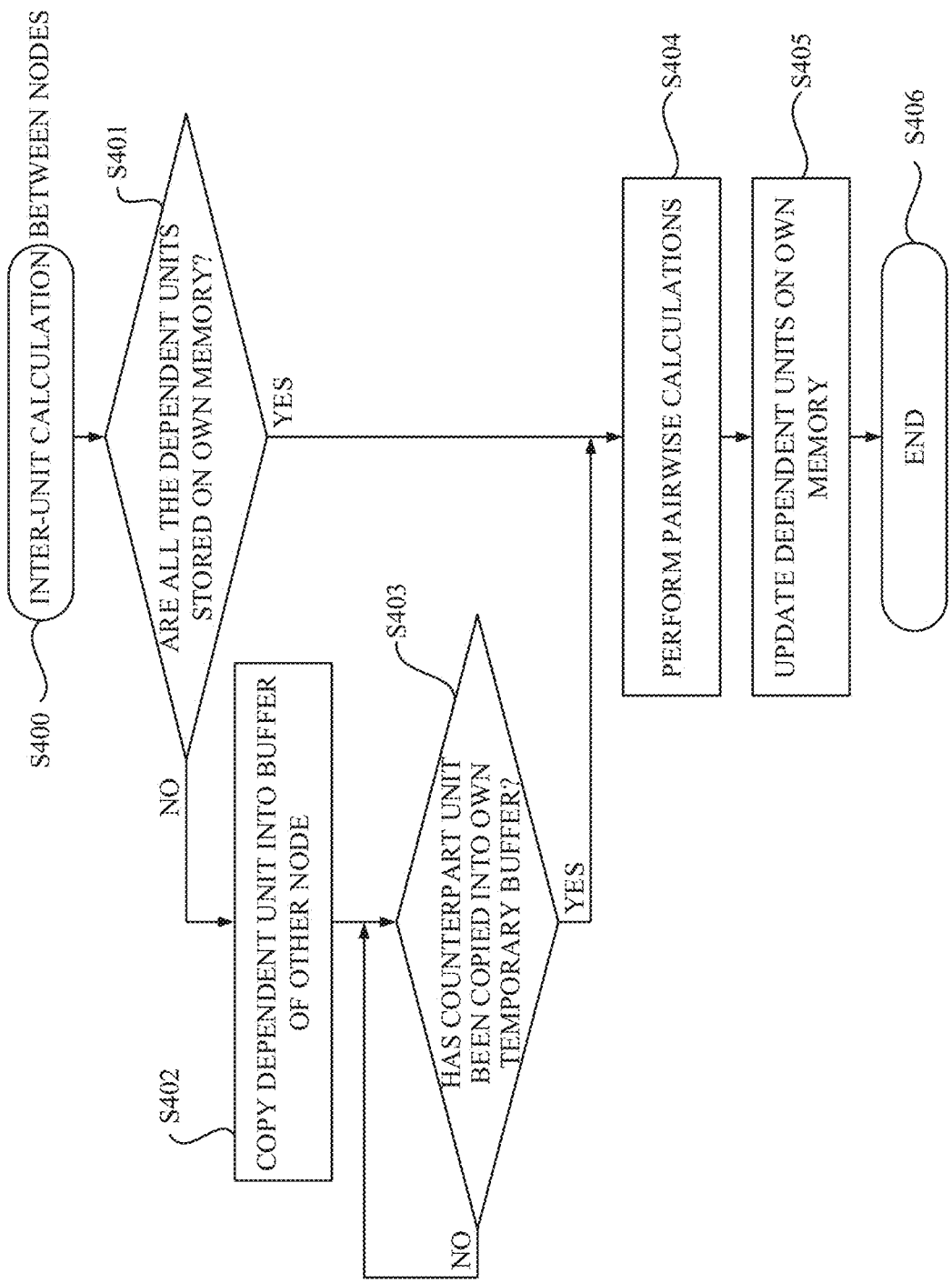
FIG. 12 is a flowchart depicting a process for performing inter-unit calculation between computing nodes in simulation of a quantum gate operation according to another exemplary embodiment of the present invention.

With reference to FIGS. 10-12, extension of the novel memory offloading functionality to a multiple node configuration is described.

FIG. 10 illustrates a way of allocating m qubit system having $2^m$ size over a plurality of computing nodes 200-1~200M (M is the number of the computing nodes), each of which includes system and device memories 220, 234, according to another exemplary embodiment of the present invention.

In the novel memory offloading functionality according to the other exemplary embodiment, the problem 400 having $2^m$ size (m is an integer representing the number of qubits in the quantum system) is first divided into a plurality of sub-problems 410, each of which has $2^n$ size. The number of the sub-problems 410 obtained from the problem 400 is $2^{(m-n)}$. The parameter n may be set such that the number of the sub-problem $2^{(m-n)}$ is equal to the number of the computing nodes in the computer system M. In the novel memory offloading functionality according to the other exemplary embodiment, each sub-problem 410 having $2^n$ size is further divided into a plurality of smaller units 420, each of which has $2^u$ size (u is an integer given as a parameter). The number of the units 420 obtained from each sub-problem 410 is $2^{(n-u)}$.

The sub-problems 410 obtained are distributed over the plurality of the computing nodes 200-1~200-M. For each computing node 200, the unit 420 obtained are distributed over the system memory 220 and the device memory(ies) 234. The way of distributing the units 420 in each computing node 200 is same as the way described with reference to FIG. 3. At least one temporary buffer 432/442/452 is prepared on each of the device memories 234 and the system memory 220. The temporary buffers 432, 442, 452 can be used for storing a copy of the dependent unit stored on a different place (including system and device memories of other computing node), during the inter-unit calculation.

During a simulation of a gate operation applied to single qubit or multiple qubits in the m qubit system, unit-wise calculations between paired quantum amplitudes may be performed. Depending on the type of the gate operation to be simulated and/or one or the parameter of the gate operation such as target and/or control qubits, the calculation may be either unit-independent calculation or inter-unit calculation.

FIGS. 11A, 11B, and 11C illustrate schematics of pairwise calculations with several pair distances during simulation of a particular single-qubit gate operation U3 in multi-node system. FIGS. 11A, 11B, 11C, and 11D shows cases where a problem corresponds to a 5-qubit system, for the sake of convenience of description. The problem with 32 quantum amplitudes $C_k$ (k∈{k=00000, ..., 11111}) are divided into two sub-problems, each of which has a 16 quantum amplitudes $C_k$ (k∈{k=p0000, ..., p1111}), where p is a first prefix of the binary strings (p∈{0, 1}). Each sub-problem is divided into four smaller units. Each unit is a sub-problem holding four quantum amplitudes $C_k$ (k∈{pxx0, ..., pxx11}, where xx is second prefix (following the first prefix) of the binary strings (xx∈{00, 01, 10, 11}).

FIG. 11A shows a case where the target qubit is equal to 1, thus, it corresponds to a case where the unit-independent calculation can be performed, as similar to the cases shown in FIGS. 8A and 8B. FIG. 11B shows a case where the target qubit is equal to 3, accordingly the distance of the pair is $2^3$, respectively. This case corresponds to a case where the inter-unit calculation is needed, as similar to the cases shown in FIGS. 8C and 8D. In the other exemplary embodiment, there is another variation, as representatively shown in FIG. 11C. FIG. 11C shows a case where the target qubit is equal to 4, accordingly the distance of the pair is $2^4$. In contrast to the cases shown in FIG. 11A and FIG. 11B where the calculation can be completed within a single computing node independently, the case shown in FIG. 11C corresponds to a case where the inter-unit calculation is needed and the data communication between multiple computing nodes are also needed.

Inter-node dependency can be handled in the same manner as the inter CPU-accelerator and the inter-accelerator dependencies. However, the inter-node dependency can be also handled in a different manner. In the described embodiment, if a unit stored on any memory of one computing node has a dependency with a dependent unit stored on any memory of other computing node, the unit located on the one computing node is copied to the temporary buffer on the memory of the other computing node where the dependent unit is placed, by way of data communication. Such data communication is also performed in reverse direction. Then, the original data stored on memory is updated based on its content and the content of the copy stored on the temporary buffer at respective computing nodes. In order to alleviate data communication overhead between the computing nodes, copying back an updated version to the one computing node that handles the original of the copy is avoided.

FIG. 12 is a flowchart depicting a process for performing inter-unit calculation between the computing nodes in simulation of quantum gate operation. The process shown in FIG. 12 may be performed by one computing node for each unit allocated thereto when the inter-unit calculation is determined to be needed at step S201 in FIG. 5. The process may begin at step S400 in response to step S203 in FIG. 5.

At step S401, the one computing node may determine whether all the dependent units are stored on own memory or not. When all the dependent units are determined to be stored on own memory in step S401 (YES), the process may branch to step S404. At step S404, the one computing node may perform pairwise calculations. At step S405, the one computing node may update dependent units on own memory and the process may end at step S406.

If the unit stored on own memory has a dependency with a dependent unit stored on other computing node, it is determined that not all the dependent units are stored on own memory in step S401 (NO). In this case, the process may branch to step S402.

At step S402, the one computing node may copy the dependent unit stored on own memory into differently placed buffer that is temporary buffer on other one computing node. At step S403, the one computing node may determine whether the counterpart unit has been copied into own temporary buffer or not. In the step S403, if the one computing node determines the counterpart unit has not been copied into own temporary buffer yet, the process may loop back to step S403. On the other hand, if the one computing node determines the counterpart unit has already been copied into own temporary buffer, the process may proceeds to step S404. At step S404, the one computing node may perform pairwise calculations using the content of the temporal buffer. At step S405, the one computing node may update dependent units on own memory and the process may end at step S406.

Note that the integer u is a parameter that may be depending on computer configurations. The parameter u can be tuned by performing a benchmark so as to maximize the performance. The parameter $n_{gi}$ may also be depending on computer configurations. In contrast to the embodiment shown in FIG. 1-FIG. 9, the parameter n may be a given parameter depending on the number of the computing nodes used in the computer system.

By virtue of the novel memory offloading functionality, $\Sigma n_{gi}$*(unit size) memory space can be saved for each computing node, and hence maximum problem size afforded by the computer system is also doubled.

The one or more embodiments has been described, in which the problem having $2^n$ size is a at least a part of the simulation of the quantum system having n or more qubits. The novel memory offloading functionality is preferably applicable to the quantum computing simulation since its problem size is power of 2 and pairwise calculations with the distance of the pair being power of 2 is performed. Also the size of the element may be $2^e$ (e is an integer representing a size per element, but can be $l*2^e$ where l is also an integer other than 2). So, inter-unit calculation can be done in a pair of 2 units with data exchange or reference.

However, there are many applications that have a size of a power of 2 other than the quantum computing simulation. Such application may include FFT (Fast Fourier Transform), multi-dimensional lattice problem (e.g., 512×512×512), etc. The novel memory offloading functionality can be applicable to such application as long as its problem having $2^n$ size is dividable into smaller units, a dense, structured and calculation order independent problem.

Experimental Studies

A program implementing the modules 150 shown in FIG. 1 and the process shown in FIGS. 4-6 according to the exemplary embodiment was coded and executed using a benchmark quantum circuit at various conditions. The number of the qubits was varied and experiments were performed with and without the novel memory offloading functionality.

The benchmark was performed by using QFT circuit. The IBM Power System S822LC for High Performance Computing with 512 GB system memory and four accelerators was used as a computing node. Tesla P100 GPU with 16 GB device memory was used as each accelerator. The number of the computing node was one.

Figure 13:
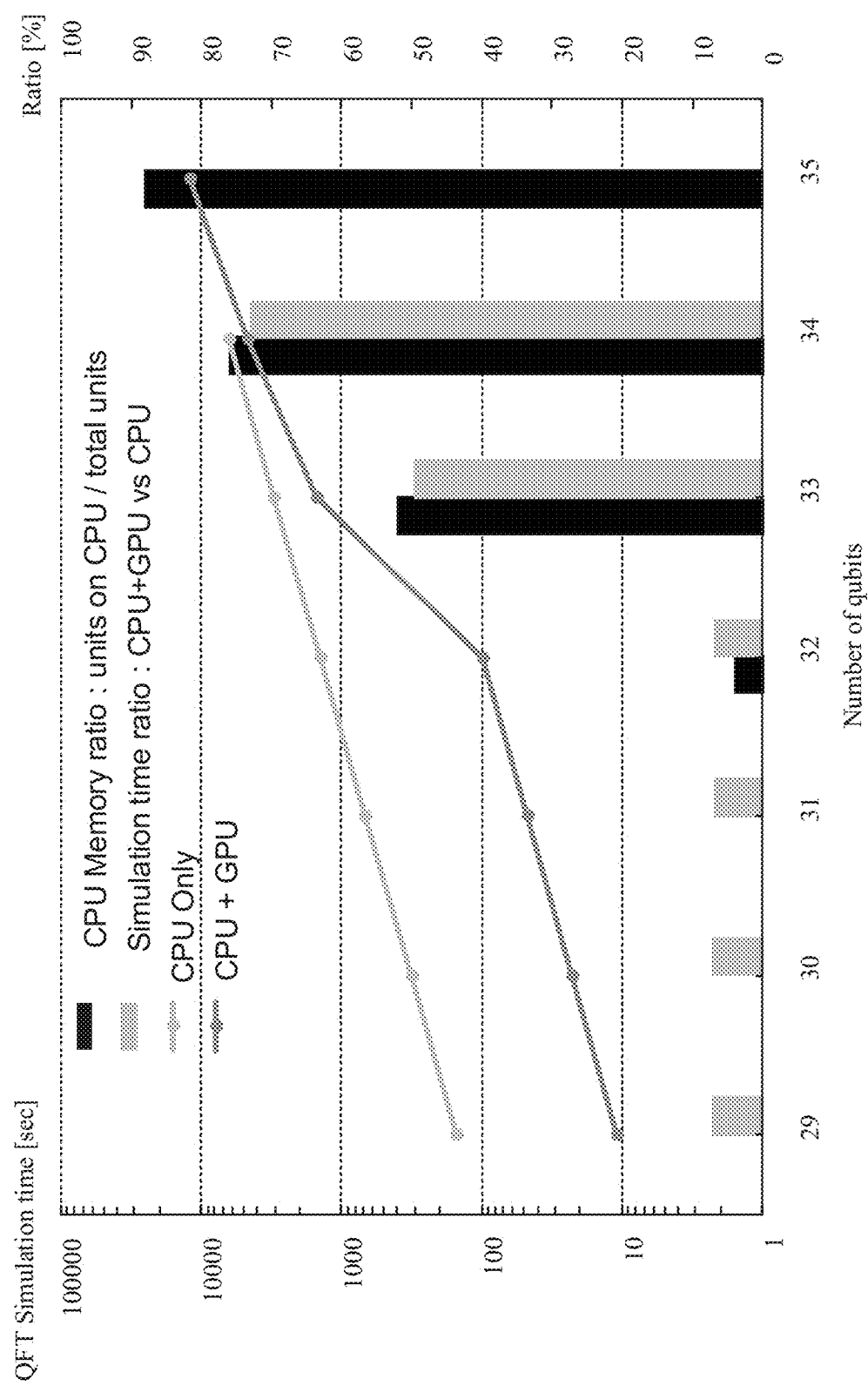
FIG. 13 depicts a graph representing a performance of quantum computing simulation with and without the novel memory offloading functionality.

FIG. 13 depicts a graph representing a performance of quantum computing simulation with and without the novel memory offloading functionality. The polygonal lines denote simulation time (sec) measured in respective cases. The light gray polygonal line represents baseline cases where only CPU is used without the novel memory offloading functionality. The dark gray polygonal line represents exemplary cases where both CPU and four GPU are used with the novel memory offloading functionality.

Note that there is no data point at the position of 35 qubits in the baseline cases. That is because the system with 512 GB could not afford sufficient memory space for 35 qubits system. Note that the 35 qubit system would need 512 GB free space. So taking into account the essential space for OS kernels, drivers, applications, etc., 1024 GB system memory would be needed for 35 qubits system.

As shown in FIG. 13, it was demonstrated that the simulation of 35 qubit system that needs 1024 GB system memory can be conducted on the computer system with 512

GB memory system by increasing only memory capacity of 64 GB (16 GB device memory×4 accelerators). It is possible to simulate one more qubit by using the novel memory offloading functionality.

The light bar represents simulation time ratio between the exemplary case with both CPU and GPU and the baseline case using only CPU. The black bar represents a system memory ratio (the number of the units on the system memory/total number of the units). As shown in FIG. 13, although the simulation time increases as the usage of the system memory increases, it was also shown that the calculation time can be shortened by using the novel memory offloading functionality.

Computer Hardware Component

Figure 14:
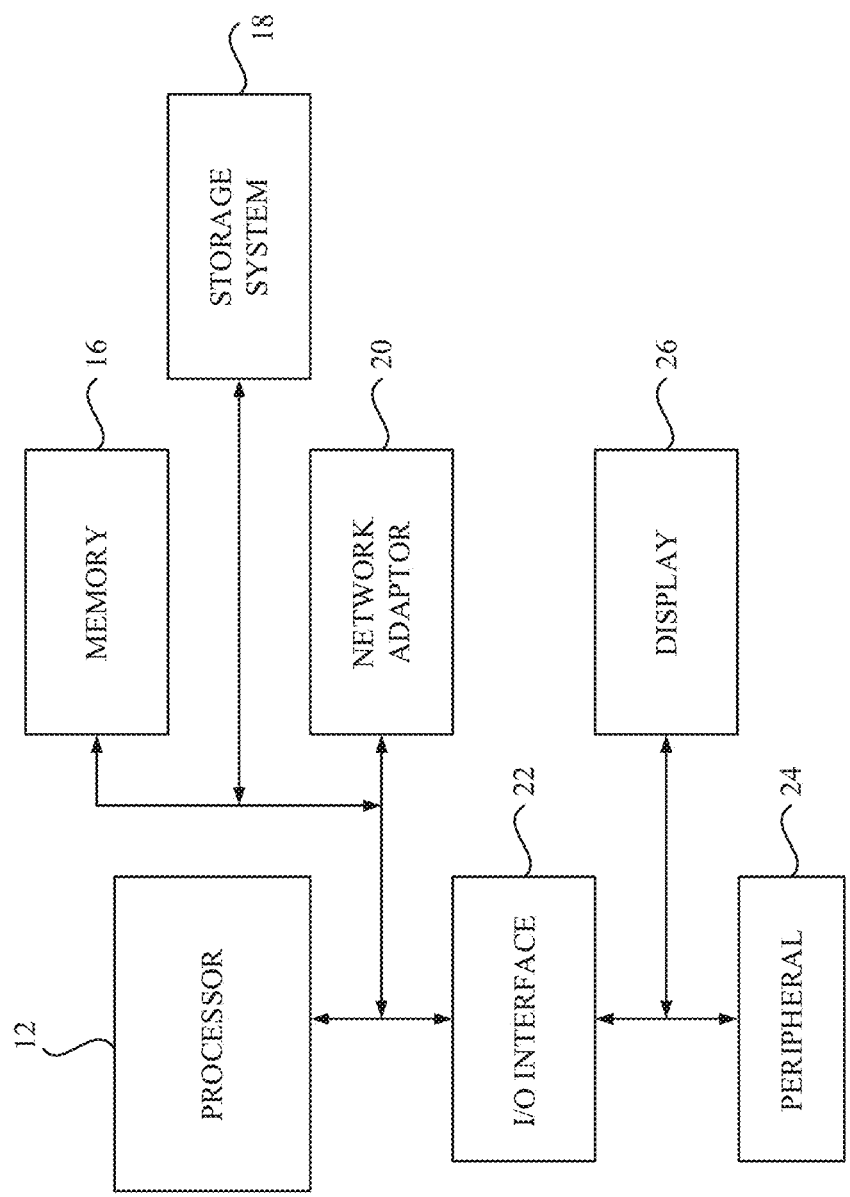
FIG. 14 depicts a computer system according to one or more embodiment of the present invention.

Referring now to FIG. 14, a schematic of an example of a computer system 10, which can be used for the quantum computing simulation system 150, is shown. The computer system 10 shown in FIG. 14 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 14, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as GPUs, a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for offloading a problem having $2^n$ size from processing circuitry to one or more accelerators, the processing circuitry and the one or more accelerators including respective memories, the method comprising:

dividing a problem having $2^n$ size into a plurality of units each having $2^u$ size;

allocating at least a part of the units to the one or more accelerators;

determining whether there is a remaining part of the units to be allocated onto the memory of the processing circuitry; and preparing a temporary buffer on each memory of at least the one or more accelerators, the temporary buffer being used for storing a copy of a dependent unit stored on a different memory, during inter-unit calculation.

2. The method of claim 1, wherein the method further comprises:
in response to the copy stored on the temporary buffer being updated, copying back an updated version of the copy to the different memory where the original of the dependent unit is stored.

3. The method of claim 1, wherein the method further comprises:
allocating the remaining part of the units onto the memory of the processing circuitry in response to determining that there is the remaining part to be allocated.

4. The method of claim 1, wherein the method further comprises:
determining whether or not inter-unit calculation is required;
during the inter-unit calculation, further determining whether a first unit stored on one memory has a dependency with a second unit stored on other memory; and
in response to determining that the first unit has the dependency with the second unit, copying the first unit, as the dependent unit, to the temporary buffer on the other memory.

5. The method of claim 4, wherein the method further comprises:
in response to determining that the first unit does not have the dependency with the second unit, making the processing circuitry and the one or more accelerators perform calculation without using the temporary buffer.

6. The method of claim 4, wherein the method further comprises:
in response to determining that the inter-unit calculation is not required, performing unit-independent calculation on the processing circuitry and the one or more accelerators independently.

7. The method of claim 1, wherein the problem having $2^n$ size is a simulation of a quantum circuit having n or more qubits.

8. The method of claim 7, wherein the necessity of the inter-unit calculation is determined based on a distance of a pair involved in calculations for simulating a quantum logic gate, and/or a type of the quantum logic gate.

9. The method of claim 1, wherein the problem having $2^n$ size is a dense and calculation order independent problem.

10. The method of claim 1, wherein the one or more accelerators is operably coupled to the processing circuitry to form a node, the problem having $2^n$ size is a part of a larger problem having $2^m$ size, and the different memory is any one of the memories within the node and other memories of other node connected to the node.

11. A computer system for offloading a problem having $2^n$ size, by executing program instructions, the computer system comprising:
processing circuitry;
a memory tangibly storing the program instructions, operably coupled to the processing circuitry;
one or more accelerators operably coupled to the processing circuitry, each accelerator including respective memories;
wherein the computer system is configured to
divide a problem having $2^n$ size into a plurality of units each having $2^u$ size;
allocate at least a part of the units to the one or more accelerators;
determine whether there is a remaining part of the units to be allocated onto the memory of the processing circuitry; and
prepare a temporary buffer on each memory of at least the one or more accelerators, wherein the temporary buffer is used for storing a copy of a dependent unit stored on a different memory, during inter-unit calculation.

12. The computer system of claim 11, wherein the computer system is further configured to:
in response to the copy stored on the temporary buffer being updated, copy back an updated version of the copy back to the different memory where the original of the dependent unit is stored.

13. The computer system of claim 11, wherein the computer system is further configured to:
determine whether or not inter-unit calculation is required;
during the inter-unit calculation, determine further whether a first unit stored on one memory has a dependency with a second unit stored on other memory; and
in response to determining that the first unit has the dependency with the second unit, copy the first unit, as the dependent unit, to the temporary buffer on the other memory.

14. The computer system of claim 13, wherein the computer system is further configured to:
in response to determining that the first unit does not have the dependency with the second unit, make the processing circuitry and the one or more accelerators perform calculation without using the temporary buffer.

15. The computer system of claim 11, wherein the problem having $2^n$ size is a simulation of a quantum circuit having n or more qubits and the necessity of the inter-unit calculation is determined based on a distance of a pair involved in calculations for simulating a quantum logic gate, and/or a type of the quantum logic gate.

16. A computer program product for offloading a problem having $2^n$ size from processing circuitry to one or more accelerators, the processing circuitry being operably coupled to a memory, the one or more accelerators including respective memories, the computer program product comprising a computer readable storage medium having program instructions embodied therewith, the program instructions executable by the processing circuitry to cause the processing circuitry to perform a method comprising:
dividing a problem having $2^n$ size into a plurality of units each having $2^u$ size;
allocating at least a part of the units to the one or more accelerators;
determining whether there is a remaining part of the units to be allocated onto the memory of the processing circuitry; and
preparing a temporary buffer on each memory of at least the one or more accelerators, the temporary buffer being used for storing a copy of a dependent unit stored on a different memory, during inter-unit calculation.

17. The computer program product of claim 16, wherein the method further comprises:
in response to the copy stored on the temporary buffer being updated, copying back an updated version of the copy to the different memory where the original of dependent unit is stored.

18. The computer program product of claim 16, wherein the method further comprises:
- determining whether or not inter-unit calculation is required;
- during the inter-unit calculation, further determining whether a first unit stored on one memory has a dependency with a second unit stored on other memory; and
- in response to determining that the first unit has the dependency with the second unit, copying the first unit, as the dependent unit, to the temporary buffer on the other memory.

19. The computer program product of claim 18, wherein the method further comprises:
- in response to determining that the first unit does not have the dependency with the second unit, making the processing circuitry and the one or more accelerators perform calculation without using the temporary buffer.

20. The computer program product of claim 16, wherein the problem having $2^n$ size is a simulation of a quantum circuit having n or more qubits and the necessity of the inter-unit calculation is determined based on a distance of a pair involved in calculations for simulating a quantum logic gate and/or a type of the quantum logic gate.

* * * * *